May 7, 1968   E. J. HUNKELER   3,381,577
POWER DRIVE FOR MACHINE TOOL
Filed March 29, 1966   2 Sheets-Sheet 1

INVENTOR.
ERNST J. HUNKELER
BY Richard W. Treverton
ATTORNEY

United States Patent Office 3,381,577
Patented May 7, 1968

3,381,577
POWER DRIVE FOR MACHINE TOOL
Ernst J. Hunkeler, Fairport, N.Y., assignor to The Gleason Works, Rochester, N.Y., a corporation of New York
Filed Mar. 29, 1966, Ser. No. 538,412
11 Claims. (Cl. 90—6)

ABSTRACT OF THE DISCLOSURE

A machine tool drive in which a cam causes reversing rotation of a shaft by reciprocating the non-rotating nut of a ball-nut and screw device whose screw element is affixed to the shaft. The reversing rotation is assisted by friction drive means which include a disc that is affixed to the shaft and has limited axial motion between two co-axial drive members constantly counter-rotated by a bevel gear drive. Reversing axial thrust loads applied to the shaft by the ball-nut and screw device are borne by oil films maintained between the disc and the counter-rotating drive members. By viscous shear of whichever film is under compression at any moment a rotation-assisting torque is applied to the disc by the drive member which supports the film.

---

The present invention relates to a power drive, especially for a gear generating machine or other machine tool, in which a reversing motion produced by a cam or like actuating and control element is augmented by torque applied by friction, preferably by viscous shear of a film of lubricant liquid.

According to the invention the drive preferably comprises a housing, an anti-friction nut and screw device of which one element is adapted to reciprocate relative to the housing and is constrained against rotation relative thereto, and of which the other element constitutes the power output element of the drive and is adapted to rotate back and forth upon reciprocation of said one element, a pair of drive members rotatable in the housing coaxially of said other element and constrained against axial motion relative to the housing, a driven member in said housing affixed to said other element and confined between said drive members for limited axial displacement relative thereto, said drive and driven members having juxtaposed faces which are adapted for separation by a film of lubricant liquid, means for applying liquid to said faces to provide and maintain such a film, and means for reciprocating said one element and for rotating said drive members oppositely to each other at higher speeds than said other element is rotated.

Load induced resistance of the output element to rotation in response to linear motion of the reciprocating element, results in the output element being urged axially with a force that is substantially proportional to the load. This axial pressure causes the driven member to compress the film of liquid that separates it from whichever one of the more rapidly rotating drive members is turning in the same direction. Consequently torque is applied to the driven member by viscous shear of the film, such torque varying directly with the axial pressure. The cam or other actuating element, and the anti-friction nut and screw device, are thus required to provide only a fraction of the total torque required to drive the output element.

A preferred embodiment of the invention is shown in the accompanying drawings wherein.

Figure 2:
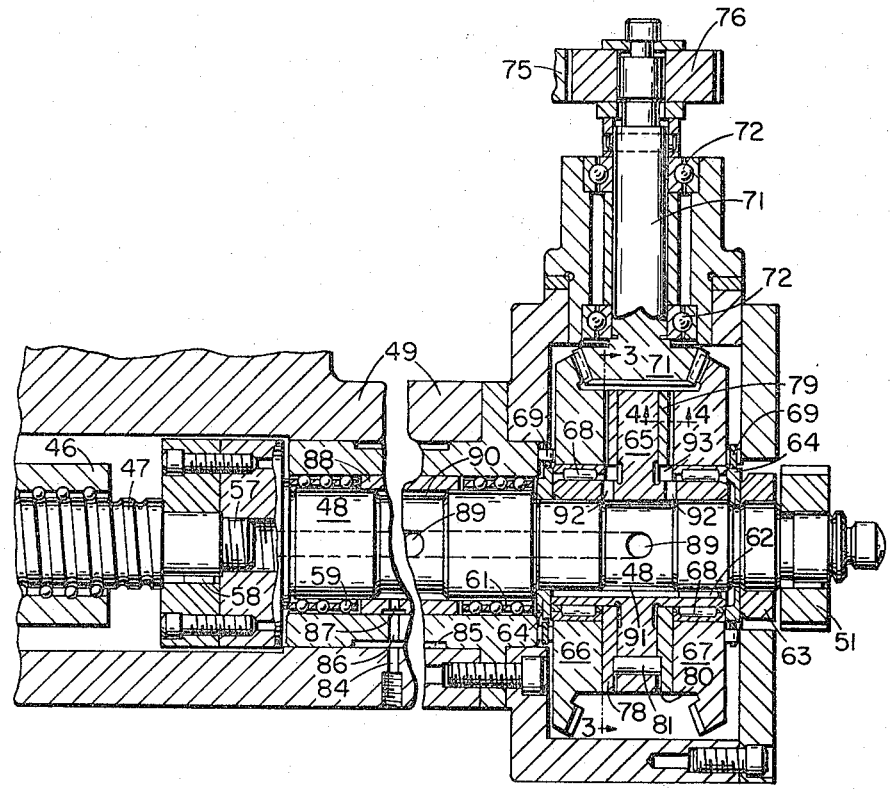
FIG. 2 is a sectional view through the drive housing in planes 2—2 of FIG. 3.
Figure 3:
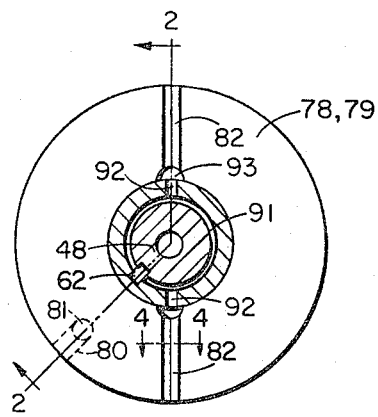
Figure 4:
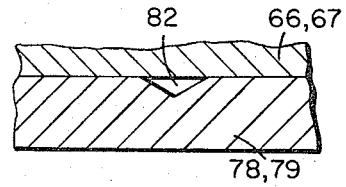

FIG. 3 is a cross-sectional view in plane 3—3 of FIG. 2, showing one face of a pressure plate on the driven member in the housing; and, FIG. 4 is a fragmentary sectional view in the plane designated 4—4 in FIGS. 2 and 3.

Figure 1:
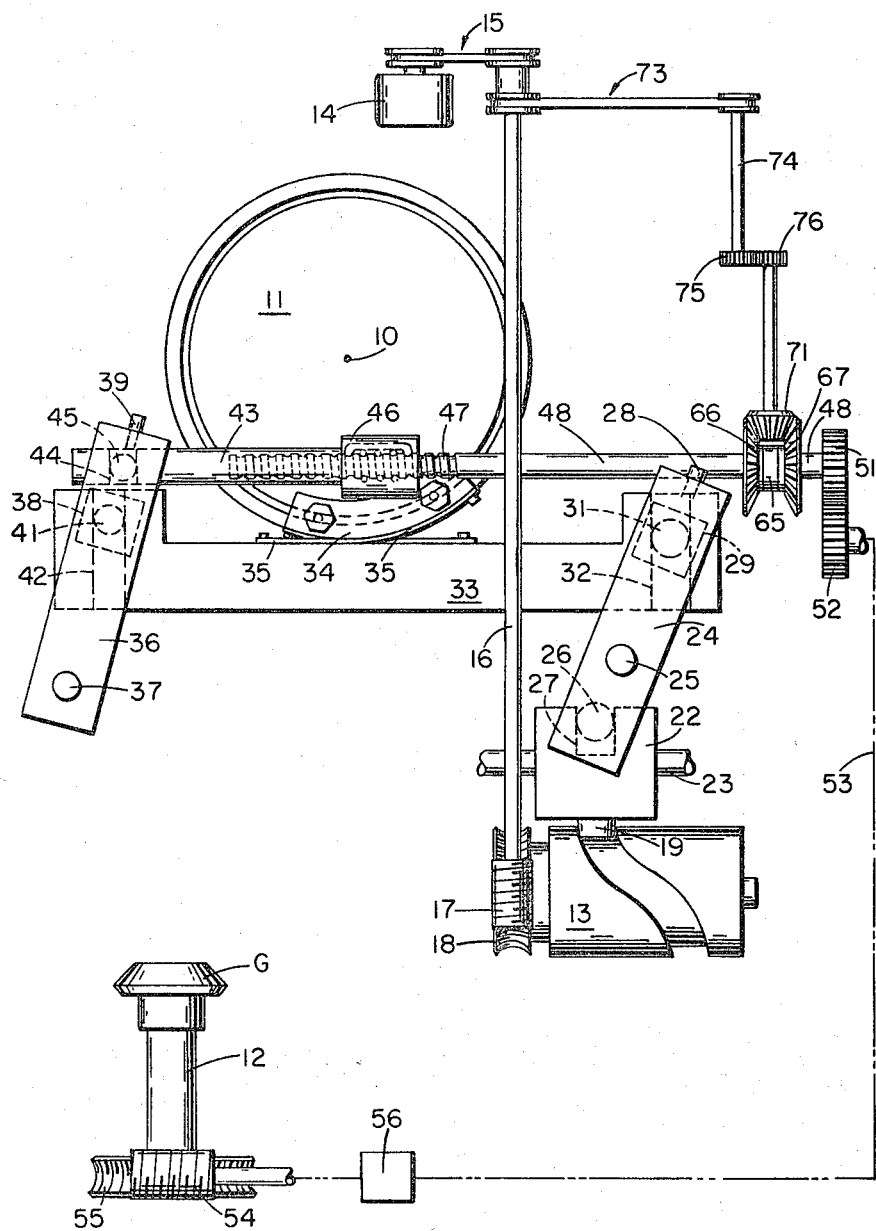
FIG. 1 is a drive diagram of a bevel gear generator in which the invention is applied to the reversing drive for the work spindle.

The gear generating machine whose drive is shown in FIG. 1 may be of the general type shown in my Patent No. 3,234,852, the frame of the machine supporting for rotation, about axis 10, a carrier 11, known as a "cradle," for either a reciprocatory or rotary tool or tools, not shown. The frame also supports the housing of a spindle, 12, upon which is mounted the work gear G whose teeth are to be cut by the tool or tools on the cradle.

The reversing drive of the cradle and work spindle includes a barrel cam 13 rotated unidirectionally by a motor 14 through a belt and pulley drive 15, shaft 16, worm 17, and a worm wheel 18 co-rotatable with the cam. A follower roller 19 in the continuous cam slot 21 around the cam, is carried by a slide 22 on a guide rod 23 stationary on the frame. A lever 24 fulcrumed to the frame by pivot 25, has at its lower end a roller 26 engaging in a straight guide slot 27 in slide 22. Adjustable along the lever by a screw 28 is a block 29 carrying a roller 31 engaged in a straight slot 32 in a horizontal slide 33. The latter is reciprocable on the frame in tangential relation to a sector 34 that is secured to the cradle for adjustment thereon about axis 10. Flexible steel tapes 35 connect the slide 33 and sector 34 so that they may roll together in non-slip relation, causing the cradle to rotate back and forth around its axis 10 upon each revolution of cam 13. The angle of such cradle rotation may be varied by adjusting the block 29 along the lever 24, toward or away from pivot 25.

A second lever, 36, fulcrumed to the frame by pivot 37, has a block 38 adjustable therealong by a screw 39, the block carrying a roller 41 engaged in a straight slot 42 in slide 33. Another slide, 43, reciprocable horizontally and non-rotatable in the frame, has a cross-slot 44 engaged by a roller 45 on the upper end of lever 36. Slide 43 includes the nut element 46 of an anti-friction nut and screw device, in this instance a recirculating ball nut and screw, whose screw element 47 is on a shaft 48. This shaft is rotatable and also capable of limited axial motion in a housing 49, FIG. 2, that is rigid with the frame of the machine.

A change gear 51 on shaft 48 meshes with a mating change gear 52 that is connected by a drive train comprising gearing and shafting, represented by chain line 53, to a worm 54 which meshes with a worm wheel 55 on spindle 12. As slides 33 and 43 reciprocate in response to rotation of cam 13, the non-rotating nut 46 imparts a reversing rotary motion to screw 47, so that the spindle 12 is rotated back and forth in time with the like motion of cradle 11. Coarse changes in the ratio of the rotations of the cradle and spindle may be made by substituting other change gears 51, 52, of different tooth number combination. Fine changes in the ratio may be made by adjusting block 38 along lever 36, toward or away from fulcrum 37. For effecting tooth-to-tooth indexing of the work spindle 12, once per revolution of cam 13, an indexing mechanism 56 is interposed in the drive train 53. This mechanism may be of any suitable kind, for example that shown in my co-pending application Ser. No. 373,395, filed June 8, 1964. The gear generating machine and drive mechanism so far described with reference to the drawings has been known prior to the present invention.

Referring now to FIG. 2, the screw element 47 is connected to shaft 48 by screw-threaded connection 57 and key 58. The shaft is journaled in housing 49, for rotation and axial motion, on axially spaced ball-sleeve bearings 59 and 61. Affixed to the shaft by key 62, nut 63 and washers 64, is a disc 65 having opposed integral hubs upon which bevel gears 66 and 67 are rotatable on roller bearings 68. The gears are supported against axial motion relative to the housing (in a direction to move them apart) by roller type axial thrust bearings 69. A shank type pinion 71, rotatable on ball bearings 72 in the housing, meshes with both gears, for driving them in opposite directions. The pinion is driven from shaft 16 through belt and pulley drive 73, FIG. 1, shaft 74 rotatable in the machine frame, and a pinion 75 meshing with a gear 76 secured to the shank of pinion 71. The ratio of the drive is such that the gears 66, 67 rotate (on the order of 500 r.p.m.) at a speed greater than the highest speed (on the order of 300 r.p.m.) that the disc 65 can be driven from cam 13 via levers 24 and 36, and nut and screw 46, 47. The drive is such that gear 67 rotates clockwise as viewed from the right of FIGS. 1 and 2. The total torque load imposed on shaft 48 includes a frictional component, due to friction of the spindle 12, and of the train of gearing and shafting connecting it to shaft 48, an inertial component resulting from the reversal of rotation and other velocity changes in these elements, and also a component resulting from cutting forces applied to the work gear G.

Seated upon the opposite faces of the disc 65, and centered on its hubs, are pressure plates 78 and 79 having plane faces in juxtaposition to the plane inner end faces of gears 66 and 67. The inner faces of the plates have radial key seats 80 receiving the ends of a key pin 81 carried by the disc. As shown in FIGS. 2, 3 and 4 the outer or gear-contacting faces of the plates have radial grooves 82. In the embodiment which is illustrated the gears and plates when assembled had a total axial clearance of about 0.001 inch when in dry or unlubricated condition. Suitable inter-connecting passages are provided in the machine for pumping the liquid lubricant to the grooves in sufficient quantity to keep them filled at all times while the machine is operating. These passages include a pipe threaded opening 84, an annular chamber 85 and passages 86 in housing 49, openings 87 through a bearing-spacer sleeve 88, annular groove 90 and drilled passages 89 in the shaft 48, and an annular chamber 91 around shaft 48 within disc 65. From this chamber the liquid flows through drilled holes 92 through the hubs of disc 65 into recesses 93 at the inner ends of grooves 82. Machine oil whose viscosity is about 300 SSU at 100° F., which is approximately the normal machine operating temperature, has been found satisfactory as the liquid lubricant.

When the cradle is being turned counterclockwise in FIG. 1, nut 46 moving to the right tends to rotate screw 47 clockwise (when viewed from the right of shaft 48). Depending upon the load on shaft 48 resisting its rotation, more or less pressure will be applied to the screw, axially to the right. This pressure tends to decrease the thickness of the oil film between plate 79 and gear 67, causing the latter to drive the plate by viscous shear of the film, while at the same time the space between the adjacent faces of plate 78 and gear 66 is increased, reducing any tendency of the last-named gear to drive the plate 78. Accordingly the device 65–67 applies a drive torque to shaft 48 in the same direction as the torque applied to it by nut 46 and of a magnitude approximately proportional to the axial pressure applied by the nut. Upon reversal of the cradle drive, with nut 46 moving to the left, the drive by device 65–67 is also reversed, with gear 66 applying a counterclockwise torque to plate 78 and shaft 48.

In order to avoid dynamic instability, which can readily occur in high gain drives of this general kind, a substantial portion of the drive load is preferably borne by the control or input element, i.e., by the ball nut and screw 46, 47. In the particular embodiment described, where the torque load on reversingly rotating shaft 48 is partly frictional and partly inertial, the frictional drive elements 66, 67, 78 and 79 and the lead of screw 47 have been so proportioned that about 35% of the drive torque for shaft 48 is provided by the ball nut and screw.

It will be seen that in the arrangement herein disclosed the ball nut and screw 46, 47, constitute an anti-friction differential device whereby input motion, of slide and nut unit 43, 46, produces differential output motions, i.e., either rotation or linear displacement of screw 47, or a combination of such rotation and linear displacement. The rotational component is applied directly to drive of the load 51, 12, G, while the linear component provides the pressure which causes the friction drive of the load by the device 65–67.

Having now described the preferred embodiment of my invention and its operation, what I claim is:

1. A power drive comprising a housing, an anti-friction nut and screw device of which one element is adapted to reciprocate relative to the housing and is constrained against rotation relative thereto, and of which the other element constitutes the power output element of the drive and is adapted to rotate back and forth upon reciprocation of said one element, a pair of drive members rotatable in the housing coaxially of said other element and constrained against axial motion relative to the housing, a driven member in said housing affixed to said other element and confined between said drive members for limited axial displacement relative thereto, said drive and driven members having juxtaposed faces which are adapted for separation by a film of lubricant liquid, means for applying liquid to said faces to provide and maintain such a film, and means for reciprocating said one element and for rotating said drive members oppositely to each other at higher speed than the maximum speed at which said other element is rotated.

2. A drive according to claim 1 in which said means for applying liquid include at least one liquid supply groove in one face of each pair of said juxtaposed faces, said groove extending from a radially inner to a radially outer portion of the face.

3. A drive according to claim 1 in which said means for reciprocating said one element and for rotating said drive members comprises a motor, a cam driven by the motor and arranged to reciprocate said one element, and a drive from the motor to said drive members.

4. A drive according to claim 3 in which said drive to said drive members comprises bevel gear teeth on each of said drive members and a bevel pinion mounted for rotation in the housing and meshing the teeth of both members.

5. A drive according to claim 1 for a gear generating machine, said drive including an oscillatory tool-carrying cradle and a work-carrying spindle, a slide connected to the cradle for reciprocation coordinated with oscillation of the cradle, said one element of said device being reciprocated by said slide and said other element of said device being geared to said work spindle for reversingly rotating it in time with oscillation of the cradle.

6. A drive according to claim 5 in which said means for reciprocating said one element and for rotating said drive members comprises a motor, a cam driven by the motor and connected to the slide for reciprocating it, and a drive from said motor to said drive members for rotating them oppositely.

7. A drive according to claim 6 in which said drive to said drive members comprises bevel gear teeth on each of said drive members and a bevel pinion mounted for rotation in the housing and meshing the teeth of both members.

8. A power drive comprising a housing, a differential device having an input element and an output element which is differentially rotated and moved linearly relative to the housing upon motion of the input element, a pair of drive members rotatable in the housing coaxially of said output element and constrained against axial motion relative to the housing, a driven member in said housing affixed to said output element and confined between said drive members for limited axial displacement relative to them, said drive and driven members having juxtaposed friction faces, and means for rotating said drive members oppositely to each other at higher speed than the maximum speed at which said driven member is rotated by said differential device.

9. A power drive comprising a housing, an anti-friction nut and screw device of which one element is adapted to reciprocate relative to the housing and is constrained against rotation relative thereto, and of which the other element constitutes the power output element of the drive and is adapted to rotate back and forth upon reciprocation of said one element, a pair of drive members rotatable in the housing coaxially of said other element and constrained against axial motion relative to the housing, a driven member in said housing affixed to said other element and confined between said drive members for limited axial displacement relative thereto, said drive and driven members having juxtaposed friction drive faces, and means for reciprocating said one element and for rotating said drive members oppositely to each other at higher speed than the maximum speed at which said other element is rotated.

10. A drive according to claim 9 in which the means for rotating said drive members comprises bevel gear teeth on each of said drive members and a pinion mounted for rotation in the housing and meshing the teeth of both members.

11. A power drive according to claim 8 in which the juxtaposed faces of said drive and driven members are adapted for separation by a film of lubricant liquid, and there are means for applying liquid to said faces to provide and maintain such film.

References Cited
UNITED STATES PATENTS 3,234,852   11/1967   Hunkler _____ 90—6

GERALD A. DOST, *Primary Examiner.*